(No Model.) 3 Sheets—Sheet 1.

C. D. WILEY.
METAL BENDING MACHINE.

No. 267,627. Patented Nov. 14, 1882.

Witnesses
O. L. Parker
R. H. Whittlesey

Inventor
Charles D. Wiley
by George H. Christy
his Atty (No Model.) 3 Sheets—Sheet 2.

C. D. WILEY.
METAL BENDING MACHINE.

No. 267,627. Patented Nov. 14, 1882.

Witnesses
C. L. Parker
R. H. Whittlesey

Inventor
Charles D. Wiley
by George H. Christy
his Atty (No Model.) 3 Sheets—Sheet 3.

C. D. WILEY.
METAL BENDING MACHINE.

No. 267,627. Patented Nov. 14, 1882.

Witnesses:
C. L. Parker
R. H. Whittlesey

Inventor:
Charles D. Wiley
by George H. Christy
his Atty

UNITED STATES PATENT OFFICE.

CHARLES D. WILEY, OF VERONA, ASSIGNOR TO THE KEYSTONE NUT LOCK COMPANY, (LIMITED,) OF PITTSBURG, PENNSYLVANIA.

METAL-BENDING MACHINE.

SPECIFICATION forming part of Letters Patent No. 267,627, dated November 14, 1882.

Application filed June 5, 1882. (No model.)

*To all whom it may concern:*

Be it known that I, CHARLES D. WILEY, a citizen of the United States, residing at Verona, county of Allegheny, State of Pennsylvania, have invented or discovered a new and useful Improvement in Metal-Bending Machines; and I do hereby declare the following to be a full, clear, concise, and exact description thereof, reference being had to the accompanying drawings, making a part of this specification, in which—like letters indicating like parts—

Figure 1:
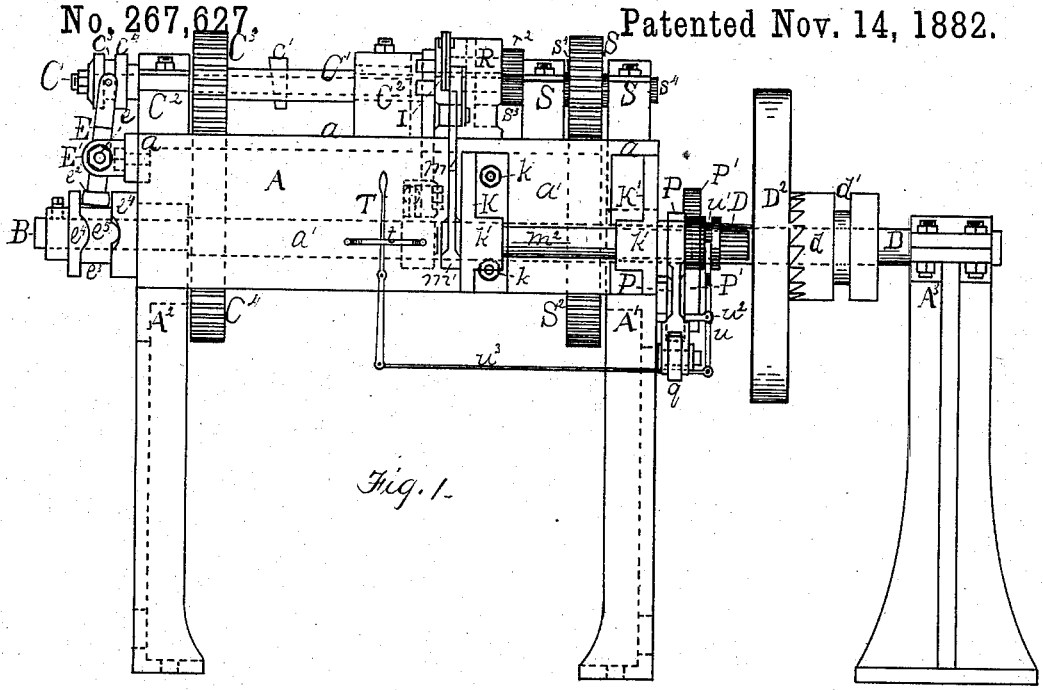
Figure 2:
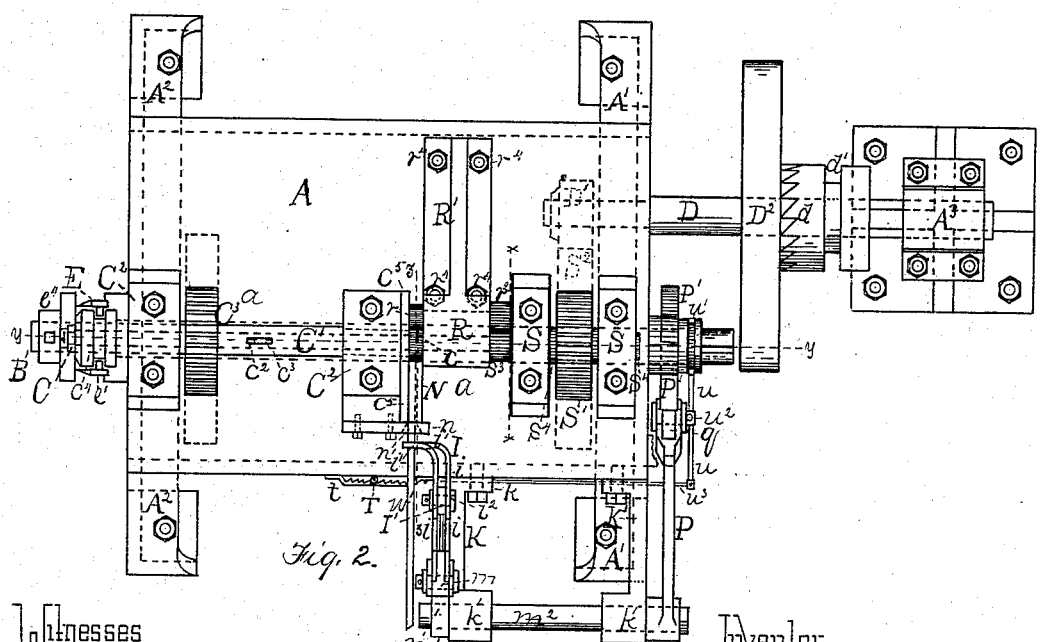
Figure 3:
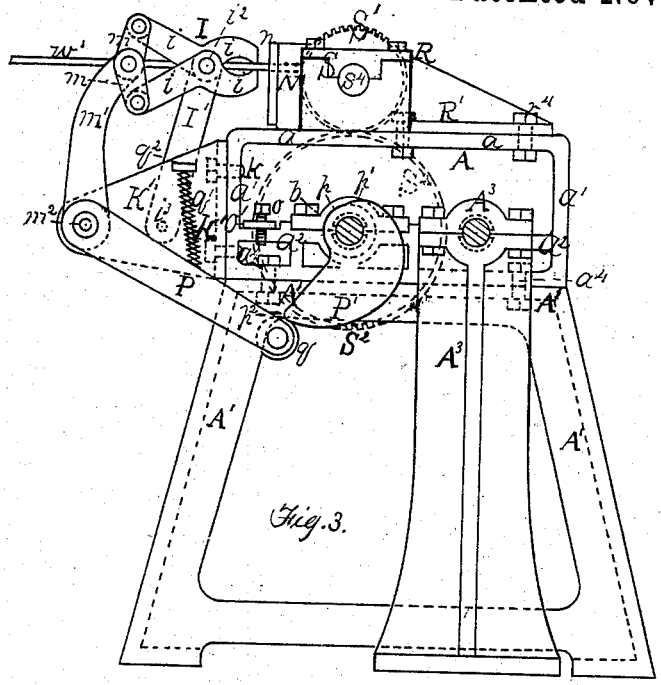
Figure 4:
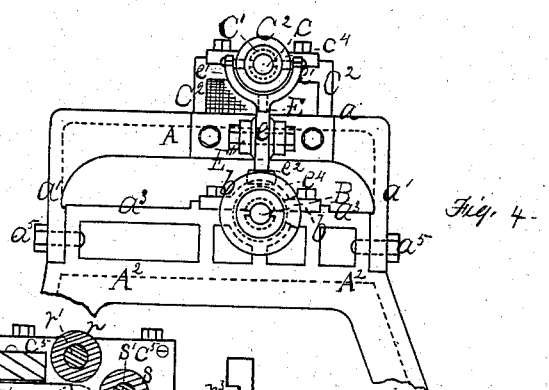
Figures 5, 6, 7:
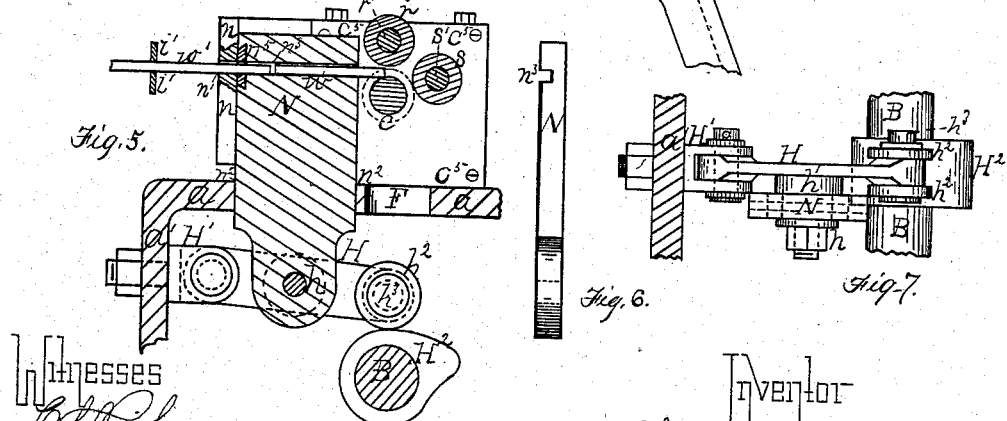
Figure 8:
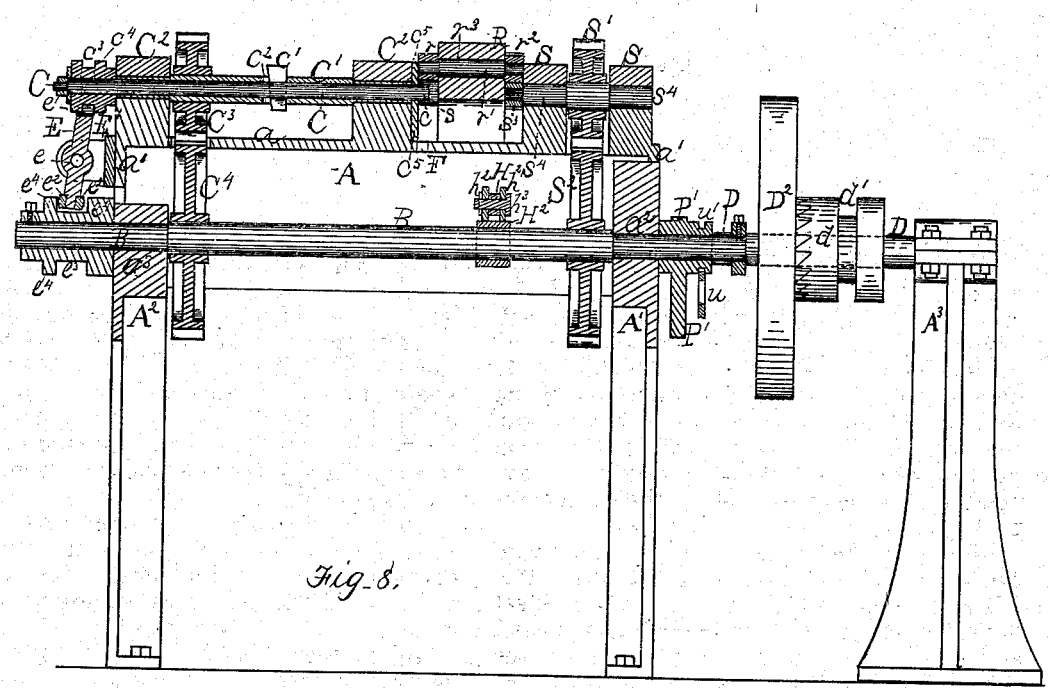
Figure 9:
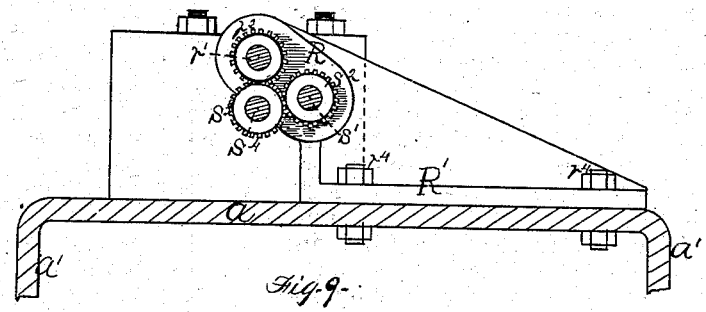
Figure 10:
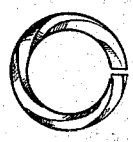

Figure 1, Sheet 1, is a view in side elevation of my improved bending-machine. Fig. 2 is a top plan view of the same. Fig. 3, Sheet 2, shows one end in elevation—the right-hand end, Fig. 1. Fig. 4 is a similar view of the left-hand end of Fig. 1, part of the frame being broken away. Fig. 5 is a transverse sectional view to an enlarged scale taken in the plane of feed represented by the line $z\,z$, Fig. 2. Fig. 6 is an edge view of the movable shear-blade. Fig. 7 is a top plan view of the shear mechanism, the scale of Figs. 6 and 7 being the same as Fig. 5. Fig. 8, Sheet 3, is a longitudinal vertical section taken in the plane of the line $y\,y$, Fig. 2, the scale being the same as Figs. 1 and 2. Fig. 9 is a transverse sectional view, to an enlarged scale, taken in the plane of the line $x\,x$, Fig. 2; and Fig. 10 illustrates a twisted ring-washer as bent into ring form by my improved machine.

My invention relates to ring-bending machines, and is designed more particularly for bending the nut-locking washer shown and described in Patent No. 249,383, of November 8, 1881.

It consists in certain features of construction and combination of a rotary bending-mandrel, bending-rolls, feed and shear devices, and mechanism for mounting and driving the same, as hereinafter more fully described and claimed.

In the drawings, A represents a cast-iron bed, of rectangular form, consisting of side plates, $a'\,a'$, top plate or table, $a$, and at one end (see Fig. 3) is cast between the side plates, at their lower edge, an open frame-work, $a^2$, for journal-bearing supports, as presently described. This end of the bed, Fig. 3, is bolted, as at $a^4$, to the top of a frame-support, A$'$. At the opposite end (see Fig. 4) the side plates, $a'$, of the bed are bolted, as at $a^5$, to the side bars of an open frame-work or journal-support, $a^3$, which, in this instance, is cast on the end support, A$^2$. The object of these features of construction in the supporting frame-work is to facilitate access to and removal of parts of the machine when occasion may require. The working parts of the machine are mounted on this frame-work as follows:

A driving shaft, B, is extended from end to end of the main frame, and is supported in journal-boxes $b\,b$ on the raised end bars, $a^2\,a^3$. (See Figs. 3 and 4.) Rotary motion may be imparted to this shaft in any desired way, though, to secure steadiness of movement under varying work, I prefer to drive it from a faster-moving shaft, D, by gear-connections S$^2$ D$'$, the wheel S$^2$ being, say, three times the size of D$'$. This shaft D is journaled upon the end frame $a^2$, and upon an outside plummer-block or post, A$^3$. Power is applied to drive it by belt-pulley D$^2$, and a grappling-clutch, $d$, is employed to put such pulley in and out of driving-connection with the shaft. This clutch mechanism may be of the usual construction with a toothed hub, $d$, secured to the shaft by sliding feather and groove, and moved by a forked lever working in the groove $d'$, the pulley D$^2$ being loose on the shaft.

Above the driving-shaft B, and parallel with it, is mounted a shorter tubular shaft, C$'$, in raised bearings C$^2$, which are cast on the face of top plate, $a$, as illustrated in Fig. 8. Within this hollow shaft C$'$ is a mandrel shaft or stem, C. A key, $c'$, and an elongated slot, $c^2$, connect the hollow shaft and mandrel-stem, so that they rotate together, and also permit of endwise movement of the stem within the shaft. Rotary motion is communicated from the driving-shaft B by means of gear-wheels C$^3$ C$^4$, the wheel C$^4$ on the driving-shaft being double the size of the other, whereby two revolutions are given to the mandrel-stem to one of the driving-shaft. Endwise motion is given to the mandrel-stem by means of a lever, E, pivoted, as at $e$, to a projecting stud, E$'$. The upper forked end, $e'$, of this lever (see Fig. 4) works in a groove, $c^3$, formed in the collar $c^4$, the latter being secured on the outer end of the mandrel-stem. The lower end of lever E carries a roller, $e^2$, and works in a cam-groove, $e^3$, formed in the collar $e^4$, which is secured to the extended end of shaft B. This cam-groove has one offset, $e^5$, (see Fig. 1,) in its circumference, which throws the mandrel-stem C to the left, restoring it quickly to the position shown in Fig. 1. The object of this endwise motion is to discharge the bent article from the mandrel $c$, and one such discharge movement is given for two revolutions of the mandrel. This mandrel $c$ is formed on the inner end of stem C, extending to the right of center bearing $C^2$, through a face-plate, $c^5$, which latter is secured to the side of the bearing by screws or in other convenient way. This face-plate forms a guide for the shear and for the rod, as presently described, and it also serves to strip the bent ring or washer from the mandrel as the latter is moved endwise.

Two bending-rolls, $r$ $s$, (see Fig. 5,) are employed to bend the sheared blank $w$ around the mandrel $c$, one roll, $r$, being mounted directly over the mandrel and co-operating with it to pass the blank forward. The other roll, $s$, is placed lower down on the side opposite the feed, in position to direct the forward end of the blank downward and press it against the mandrel. These rolls $r$ $s$ are secured on the ends of short shafts $r'$ $s'$, respectively, which are journaled in long pipe-bearings, as at $r^3$, Fig. 8, which are formed in a boss or block, R, the latter being cast on the upper angle of a triangular webbed bracket, R', (see Figs. 3 and 9,) which is bolted, as at $r^4$, to the top plate, $a$, of the bed.

Pinions $r^2$ $s^2$ (see Fig. 9) are secured on the outer ends of the shafts $r'$ $s'$, both of which gear with a pinion, $s^3$, of the same size, which is secured on the inner end of a short shaft, $s^4$, which latter is journaled in bearings S S, cast on the bed $a$, as in Fig. 8. Rotary motion is imparted to shaft $s^4$, and through the pinions to the rolls by means of intermeshing gears S' $S^2$ on the shafts $s^4$ and B, respectively, the wheel $S^2$ on shaft B being double the size of the other, whereby two revolutions are given to the rolls to one of the driving-shaft. Thus the rolls coincide in rotary movement with the mandrel $c$, both being driven from the shaft B by similar gearing, $C^3$ $C^4$ and S' $S^2$, at opposite ends of the machine, as clearly illustrated in Fig. 8.

The separate blanks $w$ are sheared from a heated rod, $w'$, as follows: A fixed shear-blade, $n$, is bolted to the front side of central bearing, $C^2$, (see Figs. 2 and 5,) through which is a hole, $n'$, for feeding the rod. A movable shear-blade, N, passes through a guide-hole, $n^2$, in the bed-plate $a$ and bears against the inner face of blade $n$, and also against the side face of plate $c^5$, being held and guided by such bearings. If desired, bearings may also be provided on the other sides of this movable shear at or near its upper end. In width this blade N extends from the fixed blade $n$ nearly to the roll $r$ and mandrel $c$, and is equal, or nearly equal to the desired length of blank $w$.

Across the inner side face of blade N is made a channel or groove, $n^3$, through which the rod is passed as it is fed through the hole $n'$. The rod being thus fed forward, a quick vertical movement is given to blade N, thereby severing from the main rod that part which extends inside the fixed blade $n$. The blade N being returned to its normal position, with the groove $n^3$ in the line of feed, it is allowed to rest for a time, during which the rod $w'$ is again pushed forward by the feed mechanism, thereby forcing the severed blank $w$ forward between the roll $r$ and mandrel $c$, by which the blank is drawn along faster than the feed movement of rod $w'$, so as to prevent any obstruction of the feed mechanism. These several movements of feed and shear mechanism are imparted as follows: The blade N is extended below the table or plate $a$, and is pivoted by bolt $h$ to a vertically-vibrating lever, H, a boss, $h'$, being by preference raised on the side of this lever to set it off out of the line of discharge through hole F below the mandrel. This lever H is pivoted at one end in a forked stud, H', which is bolted to the side plate $a'$ of bed A, on its front side. To the inner end of the lever, on either side, are pivoted rollers $h^2$ $h^2$ by bolt $h^3$, and these rollers bear upon the working-face or periphery of a lifting-cam, $H^2$, which is fixed on the driving-shaft B. By this means a quick reciprocating movement is given to the shear, as above described, the cam $H^2$ being shaped, as shown, with reference to securing the same at proper intervals, with periods of rest between such movements.

For feeding the rod $w'$ to the machine, I make use of a pair of tongs, I, composed of two centrally-pivoted arms, $i$ $i$, having laterally-extended gripping-jaws $i'$ $i'$. These tongs are supported at their central pivot, $i^2$, by a swinging bar, I', (see Fig. 3,) the upper end of which is pivoted, as at $i^2$, between the arms $i$, and its lower end is pivoted, as at $i^3$, dotted lines, to the web of a bracket, K, which is bolted to the side $a'$ of bed A, as at $k$. The outer ends of the arms $i$ of the tongs are connected by pivoted toggle-links $m$ $m$ to the end of a vibrating arm, $m'$, which is extended upward from the end of a rock-shaft, $m^2$, which latter is journaled, as at $k'$ $k'$, to the brackets K K', (see Fig. 2,) the bracket K' being similar to K, and secured to the bed A in substantially the same way. Rocking motion is given to the shaft $m^2$ by means of an arm, P, extending from it at the end of the machine toward the end of shaft B and a cam, P', secured on the end of shaft B, adapted to bear upon a roller, $q$, in the end of arm P. This cam gives the forward or feed movement to the tongs, and also, acting through the toggle-links $m$, the tongs are closed or gripped upon the rod by the same movement which carries them forward. Reverse movement is given to the arm P, and from it to the tongs by a spring, $q'$, secured to the bracket K', as at $q^2$, and to the arm. A screw, $o$, working through a threaded plate or lug, $o'$, affords an adjustable stop to arrest the upward movement of arm P under tension of spring $q'$. About one-third of the circumference of cam P' is circular, as at $p$, and while the roller $q$ is passing over this part the tongs are back and open. From this circular part $p$ the working-face makes a quick but comparatively small rise, as at $p'$, by which the tongs are quickly gripped upon the rod through the spreading action of the toggle-links $m$, as before described. From this point $p'$ the lift of the cam is gradual and uniform to its highest point, $p^2$, and this rate of lift is so related to the rotary movement as to secure a slower forward movement of the rod $w'$ than is given to the severed blank $w$ by the roll $r$ and mandrel $c$, as before described.

It is important in machines of this class that provision be made for stopping the feed-mechanism while the bending mechanism is kept in operation, in order to clear the latter of any obstruction that may be caused by imperfect, broken, or distorted blanks. I accomplish this in my machine by attaching the cam P' to shaft B by a sliding feather and groove, so as to provide for movement of the cam lengthwise on the shaft, which is effected by a forked lever, $u$, working in a groove, $u'$, in the hub of the cam. This lever is placed in an inclined position, so as to bring its lower end outside the side plate $a'$ of the bed below the brackets K K'. It is pivoted at its center to a stud, $u^2$, extending out from the end frame, A'. A rod, $u^3$, couples the lower end of lever $u$ with a pivoted hand-lever, T, which is placed in convenient position for the attendant, whose usual position is by the feed mechanism, where he can readily see when anything goes wrong.

An ordinary toothed rack, $t$, with a spring for pressing the lever into engagement with such rack may be employed to lock the cam P' either in or out of gear. If desired, similar lever and coupling connections may be made from the driving-clutch $d$ to a point within convenient reach of the workman in the same position.

If, as above described, the cam P' be moved out of gear, care should be exercised in replacing it that the tongs be in position to preserve proper relationship between the feed and shear movements and the discharging movement of the mandrel, the backward movement of the tongs, and the shearing and discharging movements being simultaneous, or approximately so, and the forward feed being done during the intervals between them.

In order to secure a smooth and easy cut, I prefer to set steel die-plates $n^5$ in one or both shear-blades N $n$, securing them by the usual dovetail form.

By feeding the rod and severed blank along the face of plate $c^5$, I not only secure a continuous unbroken guide, but also the blank is bent around the mandrel at its base or against the face-plate, thus insuring a ring or washer, Fig. 10, bent in a single plane without spiral or helical inclination. As an additional guard to this end, grooves may be made in the periphery of the rolls at their edge, so that the shoulder of the grooves on one side and the face-plate $c^5$ on the other side of the blank will co-operate with the roll face and mandrel in removing slight bends in the blank, as well as insure bending the same without spiral inclination.

It will be observed that the shafts C' and $s^4$ are in line, and their bearings may be planed out together; also, that the three pinions, $r^2$ $s^2$ $s^3$, occupy the same relative positions as the rolls $r$ $s$ and mandrel $c$.

The surface of the washer, Fig. 10, which it is desired to bend by means of my improved machine, is not smooth, but more or less uneven and irregular, owing to the twisted or spiral form of its angles. This form is given by twisting a square rod before it is fed to the bending-machine. Consequently an irregular or uneven surface is presented for the feed-tongs to grip upon.

The toggle-links $m$ of the tongs not only give them a powerful grip, but also one that will adapt itself to various forms and sizes of surface. This grip, being imparted or actuated by the movement of the tongs for feed, is kept in full force during the whole forward movement, and will be increased by any obstruction or resistance, and consequently the rod will not be liable to slip in the tongs. This I consider an important feature, considering the peculiar form of rod to be operated on.

I am aware that it is not new with me to employ a rotary and endwise moving mandrel mounted inside a rotary hollow shaft combined with mechanism for feeding blanks to the mandrel, a shear for severing them, and devices for giving the blank a spiral twist or bend about the mandrel, and I make no claim to any of such devices alone considered, nor to a combination of them, as they do not embody my invention.

I claim herein as my invention—

1. The combination of bending-rolls $r$ $s$, mandrel $c$, face-plate $c^5$, stationary shear-blade $n$, movable blade N, having groove $n^3$ across its side face, and the means, substantially as described, for giving blade N vertical movement to sever the blank and hold it in position to be fed to the mandrel and rolls.

2. The combination of fixed shear-blade $n$, having feed-hole $n'$ therein, movable blade N, having feed-groove $n^3$ across its side face, face-plate $c^5$, pivoted lever H, cam H², and driving-shaft B, substantially as set forth.

3. The combination of rotary and endwise moving mandrel $c$, rotary bending-rolls $r$ $s$, shafts $r'$ $s'$, pinions $r^2$, $s^2$, and $s^3$, shaft $s^4$, gears S' S², and driving-shaft B, substantially as set forth.

4. The combination of feed-tongs I, swinging bar I′, toggle-links $m$ $m$, vibrating arm $m'$, and the means, substantially as described, for giving the arm reciprocating motion in the direction of the length of the tongs.

5. The combination of driving-shaft B, cam P′, arm P, spring $q'$, rock-shaft $m^2$, arm $m'$, toggle-links $m$, tongs I, and swinging bar I′, substantially as set forth.

6. The combination of centrally-pivoted levers $i$ $i$, having laterally-extended gripping-jaws $i'$ $i'$, swinging bar I′, bracket K, toggle-links $m$ $m$, arm $m'$, and the mechanism, substantially as described, for giving reciprocating motion to arm $m'$.

7. The combination of rotary bending-rolls $r$ $s$, mandrel $c$, face-plate $c^5$, shear N $n$, tongs I, swinging bar I′, links $m$ $m$, arm $m'$, rock-shaft $m^2$, arm P, spring $q'$, adjustable stop $o$, cam P′, and driving-shaft B, substantially as set forth.

8. The combination of feed-tongs I, swinging bar I′, toggle-links $m$ $m$, arm $m'$, rock-shaft $m^2$, arm P, spring $q'$, adjustable stop $o$, cam P′, driving-shaft B, pivoted shifting-lever $u$, coupling-rod $u^3$, and hand-lever T, substantially as and for the purposes set forth.

In testimony whereof I have hereunto set my hand.

CHARLES D. WILEY.

Witnesses:
 R. H. WHITTLESEY,
 C. L. PARKER.